Figure 1:
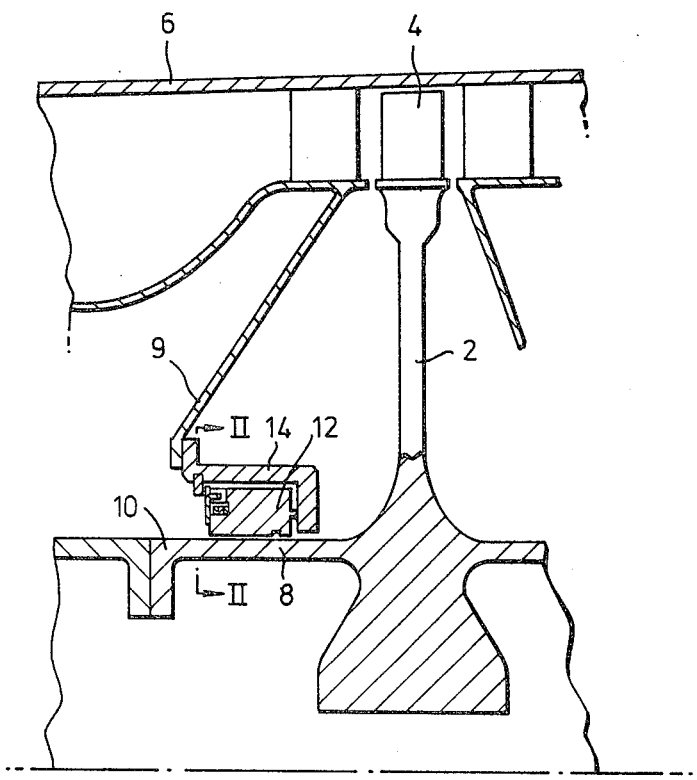

United States Patent [19]

Sargent et al.

[11] 4,426,087

[45] Jan. 17, 1984

[54] NON-CONTACTING GAS SEAL FOR RELATIVELY ROTATING PARTS

[75] Inventors: Raymond F. Sargent; Paul Newman, both of Bristol, England

[73] Assignee: Rolls-Royce Limited, London, England

[21] Appl. No.: 341,012

[22] Filed: Jan. 20, 1982

[30] Foreign Application Priority Data

Jan. 31, 1981 [GB] United Kingdom ............... 8103024

[51] Int. Cl.³ ............................................. F16J 15/34
[52] U.S. Cl. ..................................... 277/3; 277/96.1; 277/199
[58] Field of Search .................. 277/3, 27, 81 S, 96.1, 277/199

[56] References Cited

U.S. PATENT DOCUMENTS

| | | | |
|---|---|---|---|
| 2,402,032 | 6/1946 | Flinn | 277/96.1 |
| 2,828,983 | 4/1958 | Hunt | 277/81 S |
| 2,921,806 | 1/1960 | Carter | 277/81 S |
| 3,305,241 | 2/1967 | Hart | 277/199 |
| 3,606,349 | 9/1971 | Petrie et al. | 277/27 |
| 4,082,296 | 4/1978 | Stein | 277/3 |
| 4,114,900 | 9/1978 | Wiese | 277/27 |

Primary Examiner—Robert I. Smith
Attorney, Agent, or Firm—Parkhurst & Oliff

[57] ABSTRACT

In a non-contacting gas seal for a gas turbine engine a seal ring (12) (FIG. 3) is formed from a ring of overlapping segments (16) mounted in a housing (14) on a static component (9) of the engine, and co-operating to define a sealing face (15) which confronts a sealing face (10) on a rotating component (8) to form a seal. The segments overlap and are spaced at their leading ends from the rotating component to define a tapering gap (19) therebetween so that they lift away from the rotating component in operation to ride on a gas film leaving only a very small clearance.

In order to ensure that the relative circumferential dispositions of the segments does not alter significantly due to eccentric movements of the rotating component in operation, a dogged ring (34) is provided which is located in the housing by an anti-rotation dog (38) and has spaced dogs (36) engaging each of the segments to prevent circumferential movement thereof while allowing limited radial movement.

8 Claims, 6 Drawing Figures

NON-CONTACTING GAS SEAL FOR RELATIVELY ROTATING PARTS

The present invention relates to non-contacting seals, and in particular relates to non-contacting gas seals between static and rotatable components in machines, for example, turbo-machines. By the expression non-contacting seals is meant that type of seal in which confronting sealing members on the static and rotatable components run in close proximity to each other to define a clearance which provides a resistance, but not a complete blockage, to flow of fluid between the two components.

In U.K. Pat. No. 1,540,843 (equivalent to U.S. Pat. No. 4,082,296) there is described a rubbing seal for sealing fluid flow between a rotatable component and a housing containing a fluid. Reference is made in this specification, however, to rubbing seals of the segmented type in which seal segments located in the housing have sealing faces confronting a sealing face on the rotatable component, and in which the seal segments "surf-board" on the fluid causing them to be lifted from the rotatable member. The specification also makes general reference to a gas seal in which the seal is configured to produce a decrease in fluid film thickness in the direction of rotation of the rotatable member to deliberately generate such lifting forces.

Such a seal would then operate as a non-contacting seal. Leakage of gas around the back of the sealing segments is prevented by a secondary seal formed between contacting side-faces of the housing and the sealing segments.

However, we have found that the amount of lift which can be generated on the segments is critically dependent on the shape of the tapering gap between each seal segment and the co-operating sealing face, to the extent that quite small relative movements between the seal segment and the co-operating face can cause a loss of lift and rubbing contact between the two components.

Similarly, eccentric movements of the rotatable component within the static component on which the segments are usually mounted, causes the sealing clearance to close in the direction of the movement, and to open on the diametrically opposite side of the rotatable component, thus increasing the leakage clearance on the diametrically opposite side and changing the shape of the sealing clearance at other points around the seal.

When dealing with relatively high pressure differences across the seal for example, pressure differences of between 50 to 100 p.s.i. typically found in gas turbine engines, and high relative rotational speeds of the components, such problems make this type of seal relatively ineffective as a gas seal.

It is an object of the present invention to provide an improved non-contacting seal capable of use in a gas turbine engine for sealing relatively high pressure differences and in which the above-described disadvantages are reduced or eliminated.

According to the present invention, a non-contacting seal for reducing fluid flow between relatively rotatable components of a machine comprises a seal ring having a sealing face, the seal ring being adapted to be disposed, in operation, on one of the components with its sealing face confronting a co-operating sealing face on the other component to form a seal therebetween, means for locating the seal ring in a housing with freedom of movement in a direction normal to said sealing faces, the seal ring being formed in a plurality of segments, each having a face which includes a sealing area and a lifting area, said sealing area forming part of the sealing face of the ring, and further means for providing a seal between the ring and the housing, characterised in that:

the lifting area of each segment extends substantially from the leading end to the trailing end thereof, the leading end of each segment has a surface arranged to overlap a surface at the trailing end of an adjacent segment in such a manner as to provide a step between the ends of the adjacent segments whereby, in use, a tapering gap is produced between at least the lifting area of each segment face and the confronting sealing face of said other member, which converges towards the trailing end of each segment, and, means are provided for maintaining the relative circumferential positions of the segments while allowing radial movements of the segments relative thereto.

By this means the segments are constrained to move in unison without abutment of their circumferential ends during eccentric movements between the two components in operation, while allowing for relative expansions and contractions of the two components.

The expressions "leading end" and "trailing end" applied to the segments are to be understood in relation to the direction of rotation of the rotatable member.

In one embodiment of the invention which relates to a radial seal, the means for locating the seal ring radially in the housing comprises one or more piston rings located in aligned grooves in side-face of each of the segments of the seal ring.

Preferably the lifting area of the seal is pressure balanced by directing the high pressure fluid across the tapering gap to the lower pressure side thereof via a groove in the lifting area. By this means the lifting ability of the lifting area is increased.

The housing may form part of the seal which then forms a separate module which is fitted to the machine, or may be formed on the machine structure.

The means for maintaining the relative circumferential positions of the segments preferably comprises a dogged ring which is dogged to the housing and to each of the segments.

Figure 2:
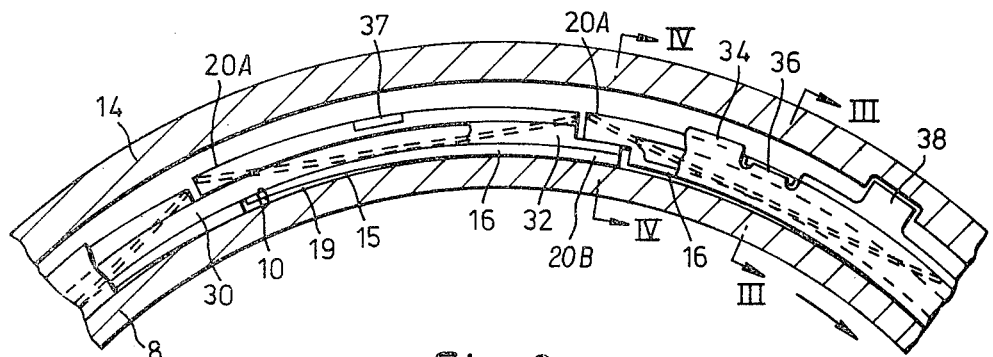
Figure 3:
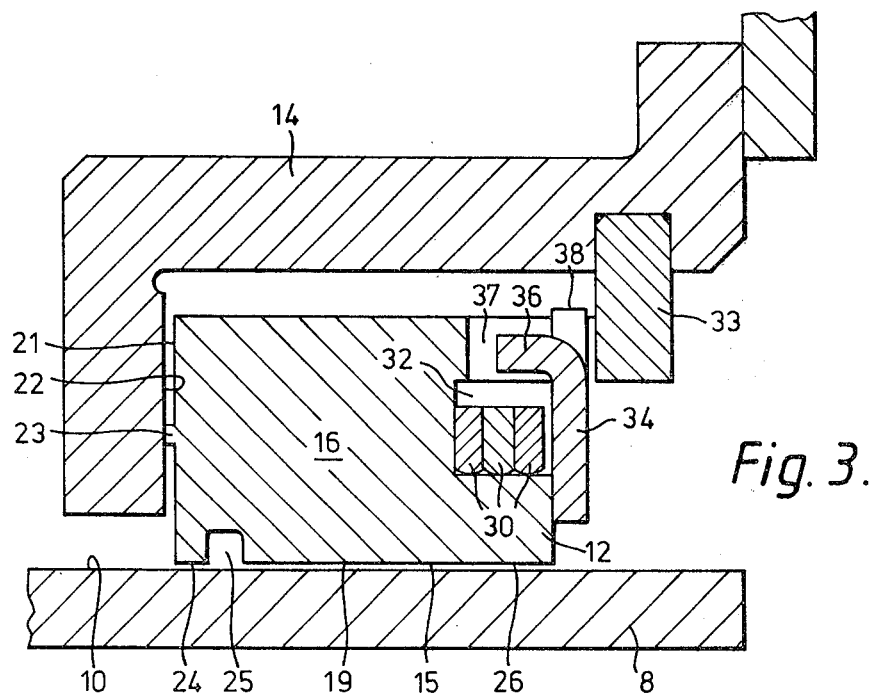
Figure 4:
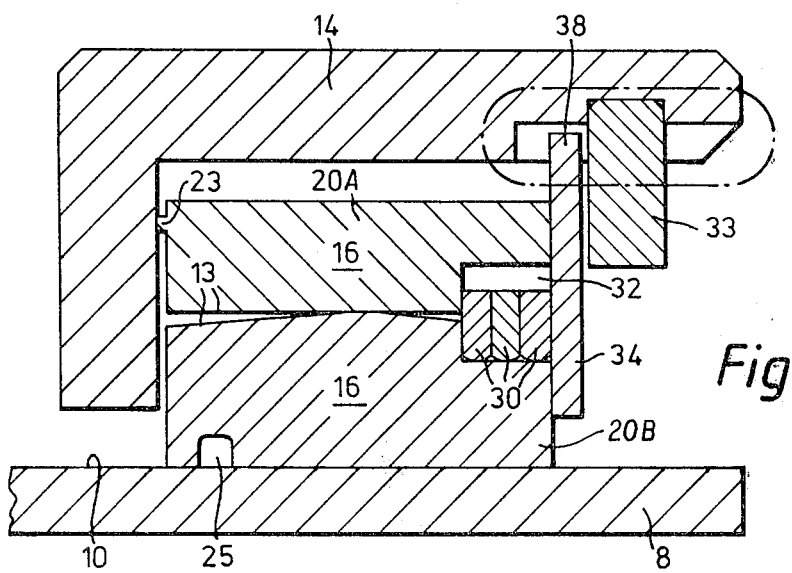
Figure 5:
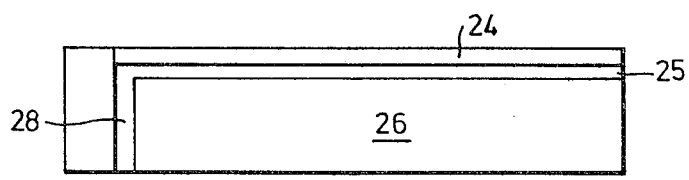
Figure 6:
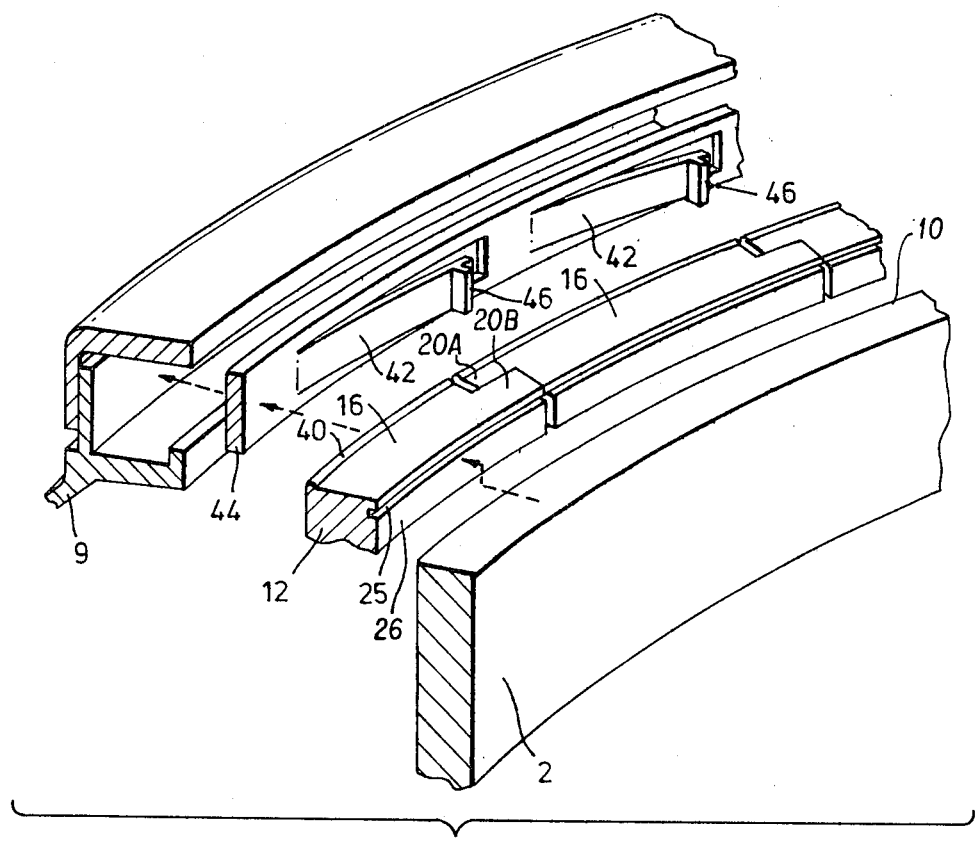

Examples of the invention will now be more particularly described with reference to the accompanying drawings in which:

FIG. 1 is a part sectional elevation of a turbine stage of a gas turbine engine incorporating a seal according to the present invention, FIG. 2 is a view on the line II—II of FIG. 1 (not to scale), FIG. 3 is an enlarged view on the line III—III of FIG. 2, FIG. 4 is an enlarged view of the line IV—IV of FIG. 2, FIG. 5 is a plan view of the sealing face of one of the segmental pads, and FIG. 6 is an exploded perspective illustration of a face seal made in accordance with the invention.

Referring now to the drawings, there is shown in FIG. 1 a turbine rotor of a gas turbine engine including a rotor disc 2 on the periphery of which are mounted a plurality of turbine blades 4. The disc is rotatable within a static casing 6 and carries an axially extending cylinder 8 which constitutes the rotating part of a noncontacting gas seal which is designed to minimise leakage of high pressure working fluid past the stator structure 9.

The cylinder 8 has a radially outwardly facing face 10 which is prepared as a sealing face by accurate machining and is preferably coated with a coating of low friction coefficient.

A seal ring 12 is provided within an annular housing 14 which is bolted to the adjacent stator structure 9. The ring 12 substantially fills the gap between the stator structure 9 and the cylinder 8 to form a seal.

Referring now to FIGS. 2 to 5 it can be seen that the seal ring is divided into segments which co-operate to define a radially inwardly facing face 15. The leading end 20A of each segment is arranged to overlap the trailing end 20B of the preceding segment and the step heights of the overlapping parts are arranged to be such that said leading end is held away from the face 10 of the cylinder 8 by a small amount (e.g. 0.004 ins.) whereby a tapering gap 19 is created between the face 15 of the seal ring and the face 10. The height of the tapering gap decreases in the direction of rotation of the rotor disc 2.

Each segment has a side-face 21 which maybe machined flat to contact a side-face on the housing to form a seal between the housing 14 and the seal ring 12. Contact is maintained between the two side-faces by the pressure fluid acting on the opposite side-face.

In practice, machining inaccuracies make it difficult to achieve true right angles between the sealing face 15 and the side-face 21 of each segment and also between the sealing faces 10 and the side-face 22 of the housing. Thus mis-alignments between these faces at right-angles can occur, and since the side-face 21 is urged into contact with the side-face 22 of the housing by the high pressure gas, these two faces tend to line up leaving any mis-alignments to be reflected in a relative tilting between the lifting faces 10 and 15. As the amount of lift generated by the gas in the tapering gap between the lifting faces is critically dependent on the faces remaining parallel in the transverse direction, mis-alignment can cause rubbing contact to occur between these faces. Thus in the preferred embodiment, as shown in FIGS. 2, 3 and 4, a chordal land 23 is provided across the side-face 21 of each segment and which stands proud of the side-face by a small amount, for example 0.010–0.020 ins. The land 23 acts as a fulcrum about which each segment can tilt to maintain parallelism between the two lifting faces even though the angles between the faces 15 and 21 or between faces 10 and 22 may not be true right angles.

As shown in FIG. 4, the lower of the two overlapping surfaces of the segments is bevelled to provide a further small fulcrum to allow slight tilting between the segments to take place.

The segments 16 are also urged towards the face 10 of the cylinder 8 by high pressure fluid which acts on the radially outwardly facing surfaces of the segments. As, in a gas turbine embodiment, this high pressure air is derived from the engine compressors, its pressure is dependent on engine speed. Thus when the engine is running at low speed and the generated air film pressure under the segments is low, so also is the air pressure on the back of the segments, so that the seal is to this extent self-balancing. This is particularly beneficial on start up when the segments are in contact with the flange because there is virtually no air pressure on the backs of the segments.

Since the pressure on the back of the segments is acting against the lifting force on the segments, it is necessary that the lift force generated in operation always slightly exceeds the gas pressures urging the segments radially inwards. To this end the face 15 of each segment is divided by a circumferentially extending channel 25 into a sealing area 24 and a lifting area 26. A recess 28 allows high pressure working fluid from the high pressure side of the seal to reach the channel 25 to balance the pressures of both sides of the lifting area 26 to increase the lifting power of the seal. Lifting force is generated by the fluid in the gap 19 being dragged into the decreasing volume towards the trailing end of the segment due to the rotation of the sealing face 10. For convenience the sealing area has its surface formed simultaneously with that of the lifting area so that both have the same curvature and define identical tapering gaps with the sealing face 10. However, it may be desirable to form the surface of the sealing area to a different shape so that it stands proud of the surface of the lifting area in order to further reduce the fluid leakage through the gap.

Spring rings 30 are provided in aligned recesses 32 cut into each segment 16. These may be designed to produce radially inward, outward or even zero spring force on the segments depending on the balance, or lack of balance between the radially inward force of the high pressure gas on the back of the segments and the radially outward lifting force generated in the tapering gap. In addition, these rings 30 serve to locate the segments 16 radially to hold them in place when the seal is removed from the cylinder 8. The segments are located axially by a circlip 33.

To optimise configuration of the segments to produce maximum lift it has been found that the length to width ratio of the segments should be between 3:1 and 2:1.

In order to prevent the segments from moving too far independently in the circumferential direction, a dogged ring 34 is provided which has spaced dogs 36 thereon, one for each segment, and which fit into cutouts 37 in the segments. Thus during any vibration of the rotor disc 2, or any other circumstance causing eccentric movement of the cylinder 8 relative to the housing 14, radially outward movement of any one of the segments caused by an increase in fluid pressure in the film beneath it will cause the ring to move outwardly. This in turn will cause all of the segments to move in the same direction following the movement of the cylinder 8 and maintaining the gap profile between each segment and the cylinder. The ring 34 is prevented from rotation relative to the housing by an anti-rotation dog 38, and this in turn prevents relative rotation between the seal ring and the housing. The dog 38 is shown for convenience in the insert within the dotted area of FIG. 4 which is a partial cross-section through the dog 38.

The embodiment described is a radial seal for sealing a radial gap between cylindrical surfaces. However, the present seal construction is easily modified to act as a face seal as shown in FIG. 6 in which similar parts are given the same reference numerals. In this embodiment the segments 16 of the seal ring 12 are located, for example, in an annular housing on adjacent fixed structure 9 which has an axially facing opening to accommodate axial movements of the sealing ring caused by relative axial movements of the turbine disc and the adjacent fixed structure.

In this embodiment the design of the segments is almost the same as in the previous embodiments except that the narrow sealing land which forms the secondary seal is circumferential and is shown at 40.

The locating means is shown as including light spring members 42 which are cut out from a spring ring 44 and lightly urge the segments 16 towards the rotor disc for starting purposes, and include dogs 46 which constitute the means for maintaining the relative circumferential positions of the segments.

Although the invention has been described with reference to seals between static and rotating parts of a machine, the principle of operation would be the same if the relative rotation was produced by both of the parts rotating. Thus, for example, a seal according to the present invention could act as an intershaft seal between contra-rotating or even para-rotating shafts. In such embodiments, however, consideration would have to be given to the centrifugal forces acting on the segments.

We claim:

1. A non-contacting seal for reducing fluid flow between relatively rotatable components of a machine comprises a seal ring having a sealing face, the seal ring being adapted to be disposed, in operation, on one of the components with its sealing face confronting a cooperating sealing face on the other component to form a seal therebetween, means for locating the seal ring in a housing with freedom of movement in a direction normal to said sealing faces, the seal ring being formed in a plurality of segments, each having a face which includes a sealing area and a lifting area, said sealing area forming part of the sealing face of the ring, and further means for providing a seal between the ring and the housing, characterised in that:

the lifting area of each segment extends substantially from a leading end to a trailing end thereof, the leading end of each segment being arranged to overlap the trailing end of an adjacent segment in such a manner as to provide a step between the ends of the adjacent segments whereby, in use, a tapering gap which converges towards the trailing end of each segment is produced between at least the lifting area of each segment face and the confronting sealing face of said other component, said tapering gap for generating lift to maintain non-contact between at least the lifting area of each segment face and the confronting sealing face of said other component, and, means for maintaining the relative circumferential positions of the segments while allowing radial movements of the segments relative thereto.

2. A non-contacting seal as claimed in claim 1, wherein the means for maintaining the relative circumferential positions of the segments comprises a ring which is dogged to the housing and to each of the segments.

3. A non-contacting seal as claimed in claim 1 or claim 2 wherein, the housing forms a part of the structure of the machine and the seal ring is assembled into it.

4. A non-contacting seal as claimed in claim 1 or claim 2, in which the seal ring is located on a static component of the machine and the sealing face confronts a sealing face on a rotating component.

5. A non-contacting seal as claimed in claim 1 or claim 2 in which the seal is a radial seal and the means for locating the seal ring in the housing comprises at least one spring ring located in aligned grooves in each segment.

6. A seal assembly as claimed in claim 1, wherein the machine is a gas turbine engine.

7. A non-contacting seal as claimed in claim 1, wherein the seal is a face seal.

8. A non-contacting seal as claimed in claim 1 or claim 2, in which a recess and a channel are provided in the lifting area of the face of each segment to allow the fluid on the higher pressure side of the segment to communicate with a circumferential groove on the lower pressure side of the lifting area to pressure balance the lifting area.

* * * * *